United States Patent
Fiedler

(10) Patent No.: US 9,266,060 B2
(45) Date of Patent: Feb. 23, 2016

(54) DRY SCRUBBER SYSTEM

(71) Applicant: ALSTOM Technology Ltd, Baden (CH)

(72) Inventor: Mark Albert Fiedler, Lenoir City, TN (US)

(73) Assignee: ALSTOM Technology Ltd, Baden (CH)

(*) Notice: Subject to any disclaimer, the term of this patent is extended or adjusted under 35 U.S.C. 154(b) by 281 days.

(21) Appl. No.: 13/851,328

(22) Filed: Mar. 27, 2013

(65) Prior Publication Data

US 2013/0294992 A1 Nov. 7, 2013

Related U.S. Application Data

(60) Provisional application No. 61/643,432, filed on May 7, 2012.

(51) Int. Cl.
*B01D 53/14* (2006.01)
*B01D 53/50* (2006.01)

(52) U.S. Cl.
CPC ........ *B01D 53/508* (2013.01); *B01D 2259/128* (2013.01)

(58) Field of Classification Search
None
See application file for complete search history.

(56) References Cited

U.S. PATENT DOCUMENTS

| | | |
|---|---|---|
| 4,610,849 A | 9/1986 | Van Camp et al. |
| 2002/0113014 A1* | 8/2002 | Stroup .......................... 210/637 |
| 2008/0175775 A1* | 7/2008 | Fleischanderl et al. ........ 423/210 |
| 2009/0074642 A1* | 3/2009 | Maramchik ................ 423/215.5 |

FOREIGN PATENT DOCUMENTS

WO WO 97/37747 10/1997

* cited by examiner

*Primary Examiner* — Jennifer A Smith
*Assistant Examiner* — Anita Nassiri Motlagh
(74) *Attorney, Agent, or Firm* — Rita D. Vacca

(57) ABSTRACT

An air quality control system (AQCS) useful for processing a gas stream, such as a flue gas stream emitted from a fossil fuel fired boiler, for at least partial removal of acidic and like pollutants therefrom. The air quality control system includes a CDS reactor useful using a reducing agent slurry.

12 Claims, 2 Drawing Sheets

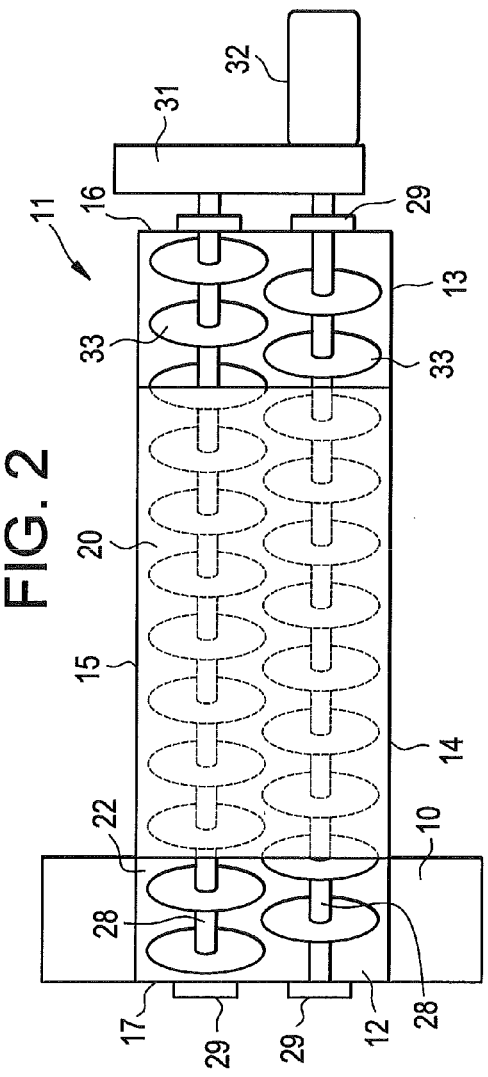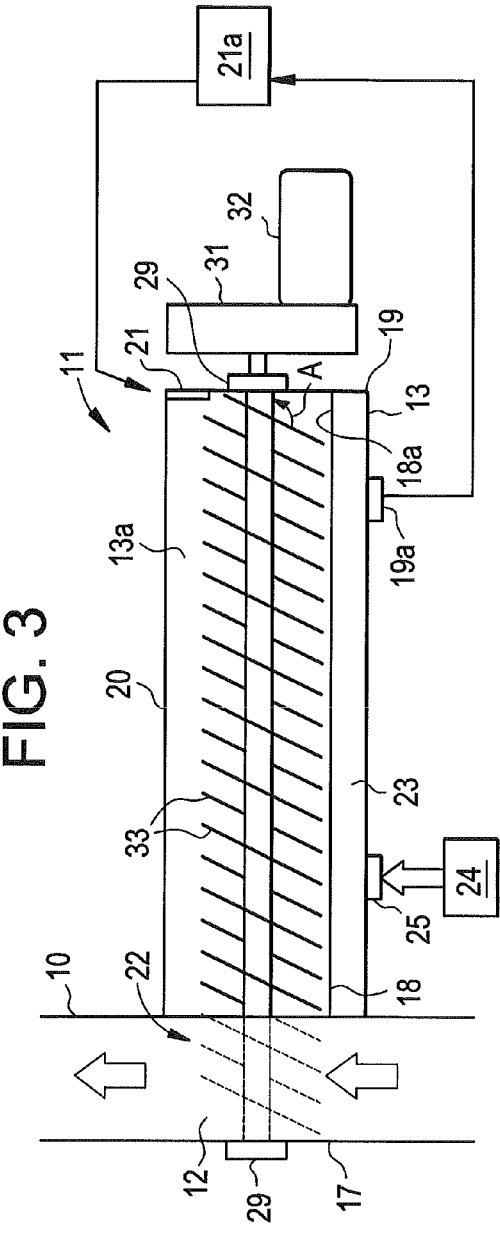

DRY SCRUBBER SYSTEM

CROSS-REFERENCE TO RELATED APPLICATION

This application claims the benefit of U.S. Provisional Patent Application Ser. No. 61/643,432; filed on May 7, 2012, which is incorporated herein by reference in its entirety.

FIELD OF THE INVENTION

The present invention is generally directed to an air quality control system (AQCS) useful for processing a gas stream, such as a flue gas stream emitted from a fossil fuel fired boiler, a combustion process or the like. More particularly, the present invention is directed to a circulating dry scrubber (CDS) dry flue gas desulfurization (DFGD) system operable using a lime slurry supply, to process a gas stream.

BACKGROUND

In the processing or treatment of flue gases or gas streams, dry flue gas desulfurization (DFGD) systems are known. In DFGD processes, lime (CaO) is first converted to hydrated lime ($Ca(OH)_2$) before contact with the flue gas. The hydrated lime contacts the flue gas as a dry or moistened powder in a circulating dry scrubber (CDS) DFGD system. An example of such a CDS DFGD system is the ALSTOM NID™ system (ALSTOM Power Inc., Paris, France).

U.S. Pat. No. 4,610,849, invented by John Van Camp et al., discloses a spray dryer absorber (SDA) DFGD system that uses an aqueous slurry containing an alkaline reagent for reaction with sulfur oxides in a flue gas. This SDA DFGD system uses an array of spaced apart nozzles adapted to introduce a plurality of spray patterns into a reaction zone. The spaced apart nozzles introduce the aqueous slurry containing an alkaline reagent into the reaction zone for contact with the flue gas for reaction of the alkaline reagent and the sulfur oxides in the flue gas.

WO 97/37747, invented by Stefan Ahman et al., discloses a device for a CDS DFGD system useful for discharging and distributing an absorbent material in a flue gas duct. Accordingly, in a vertical flue gas duct for flue gases containing gaseous pollutants, a discharging and distributing device is arranged to discharge and distribute a particulate absorbent material reactive with the gaseous pollutants in the flue gas to convert the gaseous pollutants to a separable dust.

While methods and equipment capable of removing both particulate and gaseous pollutants from a flue gas stream exist, there remains a need for improved CDS DFGD methods and equipment that allows for reduced capital investment and reduced operation associated costs while maintaining efficiency and effectiveness.

SUMMARY OF THE INVENTION

The present invention provides an air quality control system (AQCS) comprising a circulating dry scrubber (CDS) dry flue gas desulfurization (DFGD) system operable using an aqueous slurry comprising a reducing agent such as lime, rather than a dry or moist powder reducing agent. The subject AQCS system uses a CDS DFGD system in combination with a fabric filter module to treat flue gas for the removal of sulfur dioxide, and like particulate and gaseous pollutants therefrom. Traditionally, flue gas CDS DFGD systems are designed and engineered to operate using a dry or moist powder reducing agent, such as lime. The use of dry or moist powder lime is desirable due to lower capital investment requirements and associated operating costs as compared to wet flue gas desulfurization (WFGD) systems or spray dryer absorber (SDA) DFGD systems that operate using an aqueous lime slurry. However, as with all plant equipment, after a period of time the equipment becomes worn and replacement becomes necessary. The present invention is specific to instances where an air quality control system (AQCS) requires WFGD system or SDA DFGD system equipment replacement, and the equipment is replaced with a CDS DFGD system. In such a situation, the capital investment required for equipment to produce an aqueous reducing agent slurry, such as an aqueous lime slurry, has already been made and is in place. Rather than eliminating the slurry production equipment and investing additional capital to construct dry or moist powder reducing agent production and transport equipment for its use in the new replacement CDS DFGD system, the subject replacement CDS DFGD system is newly designed and engineered to operate using an aqueous reducing agent slurry, such as a lime slurry. The benefits of a replacement CDS DFGD system that operates using a reducing agent slurry include decreased capital costs, increased reliability and increased operating flexibility.

The AQCS of the present invention comprises a gas duct through which flue gases from a combustion process flow for treatment prior to release to the atmosphere. Arranged in the flue duct, is an inlet damper to a CDS DFGD system. The CDS DFGD system comprises a flue gas scrubber or reactor and a reducing agent slurry feed input fluidly connected to a reducing agent slurry supply. The reducing agent slurry supply may be in the form of a tank or other suitable container for slurry storage. Fluidly connected to the reactor is a fabric filter or electrostatic precipitator for removal of particulate matter from the flue gas prior to its release to the atmosphere through a stack. Using the subject AQCS equipped with a CDS DFGD system and a fabric filter module, dirty flue gas laden with particulate and/or gaseous pollutants, such as for example, $SO_2$, $SO_3$, HCl, HF, fly ash particulates and/or like acidic contaminants, enters the AQCS through a single inlet damper for cleaning. As the flue gas passes through the inlet damper and into the CDS reactor, a moist reducing agent from an aqueous reducing agent slurry is uniformly dispersed across a horizontal cross section of the reactor through which the flue gases flow. The moist reducing agent reacts with the acidic gases, i.e., $SO_2$, HCl, $SO_3$ and/or HF, and the reacted moist reducing agent is dried by the flue gas to create a dry particulate by-product. The dry particulate by-product is then captured within the fabric filter module or like particulate removal device of the AQCS. The captured dry particulate by-product is collected in fluidly connected hoppers and fed back to the aqueous slurry before again being uniformly distributed within the CDS reactor. The "cleaned" flue gas leaves the fabric filter module through a fluidly connected gas duct fluidly connected to a stack for cleaned flue gas, CG, release to the atmosphere.

Like most traditional fabric filters, the present AQCS uses a fabric filter sectioned into multiple integrated components. By having multiple integrated components, an operator may isolate one or more individual integrated components for maintenance while keeping the remaining integrated components in operation. Likewise, one or more individual integrated components may undergo "turn down" during periods of low demand/low gas flow/low contaminant output, so as to limit or avoid needless equipment wear, energy consumption and like operation associated costs. The subject AQCS as described in greater detail below, uses an aqueous reducing agent slurry in a CDS DFGD system and a fabric filter module to treat flue gas while reducing capital costs, increasing reliability, increasing operating flexibility, and increasing turn down capability.

Additional features of the present invention will be apparent from the following description from which the preferred embodiments are set forth in detail in conjunction with the accompanying drawings.

BRIEF DESCRIPTION OF THE DRAWINGS

FIG. 2 is a top cross sectional view of a CDS DFGD system with a distribution device according to the present invention; and FIG. 3 is a side cross sectional view of the CDS DFGD system and distribution device of FIG. 2.

DETAILED DESCRIPTION OF THE EMBODIMENTS

Figure 1:
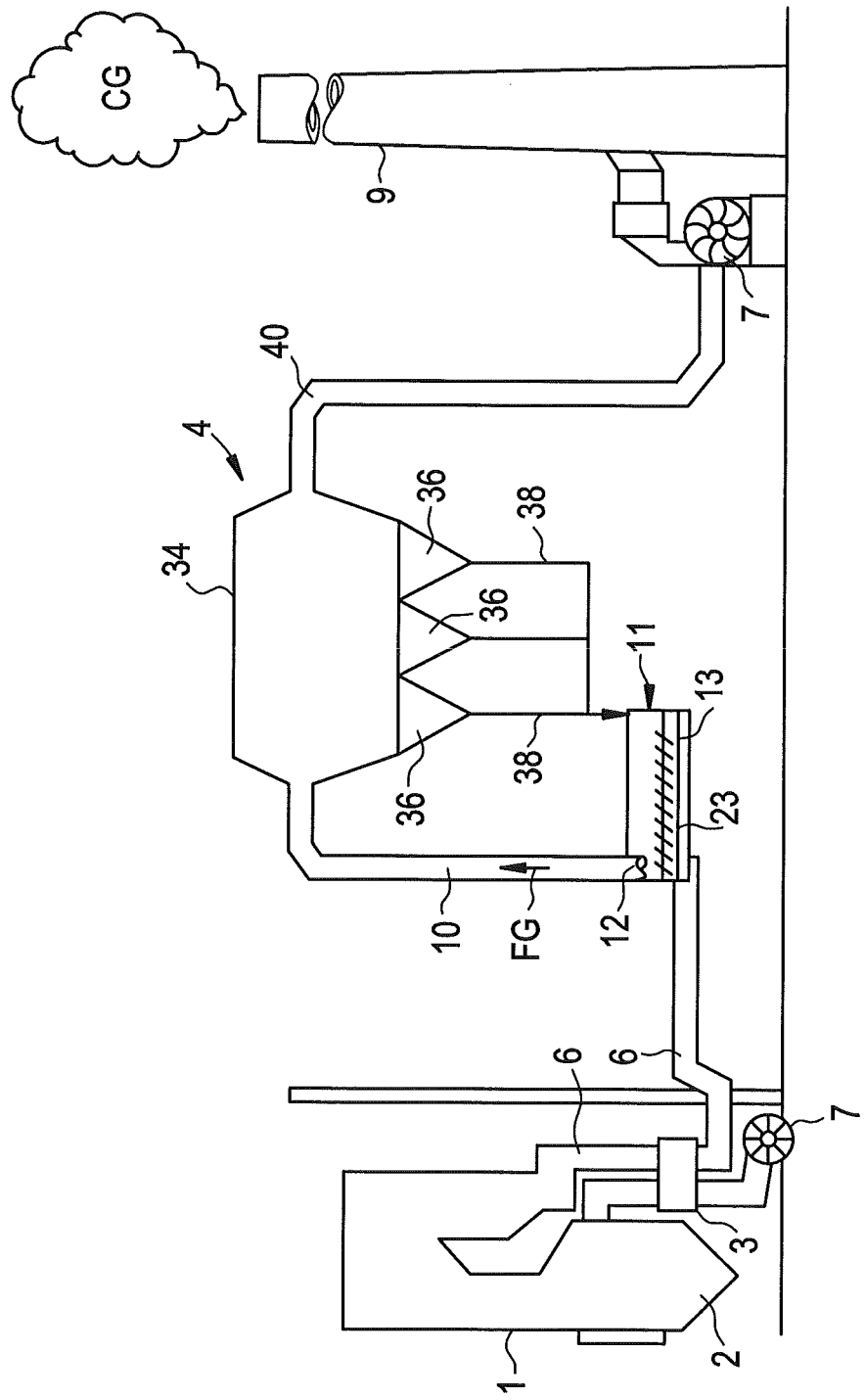
FIG. 1 is a schematic view of a plant with an air quality control system for cleaning flue gases from a combustion process.

One embodiment, generally depicted in FIG. 1 as a process schematic diagram that includes a boiler 2, an air quality control system (AQCS) 4 and a stack 9. It is noted that many additional and varied process steps using additional equipment may be positioned or take place between boiler 2 and AQCS 4, as is known to those skilled in the art. Likewise, many additional and varied process steps using additional equipment may be positioned or take place following AQCS 4 and prior to environmental release of a "cleaned" flue gas, CG, from stack 9, as is known to those skilled in the art. Such additional process steps and/or equipment are not described in further detail herein for purposes of clarity and simplicity.

As noted previously, FIG. 1 illustrates schematically an AQCS 4 for cleaning dirty flue gases, FG, from a plant 1 conducting a combustion process, such as those from a fossil fuel-fired or coal-fired boiler 2. The hot flue gases containing $SO_2$, $SO_3$, HCl, HF, fly ash particulates and/or like acidic pollutants, flow from boiler 2 through a fluidly connected gas duct 6, which may optionally include a heat exchanger 3 arranged therein to transfer heat from the hot flue gases for other uses. Likewise, one or more fans 7 may be used in the plant 1 for transport of flue gases from the boiler 2 through to stack 9. Gas duct 6 has a vertical portion 10 comprising a CDS reactor 12. In CDS reactor 12 in vertical portion 10 is a distribution device 11, which introduces in a manner described in more detail below, a moist reducing agent such as lime into the flue gases flowing therethrough.

The distribution device 11 is similar to that disclosed in WO 96/16727. As best illustrated in FIGS. 2 and 3, the distribution device 11 comprises a container 13 essentially in the shape of an elongated box. Container 13 comprises two opposed vertical side walls 14 and 15, connected between a vertical rear wall 16 and a vertical front wall 17. Forming a base for container 13 is a horizontal upper bottom 18 surrounded by walls 14, 15, 16 and 17, and a horizontal lower bottom 19 spaced apart from horizontal upper bottom 18 and likewise surrounded by walls 14, 15, 16 and 17. Container 13 also comprises a horizontal lid 20. At rear wall 16, container 13 has an inlet 21 through which reducing agent slurry is supplied to interior 13a of container 13 from a reducing agent slurry supply 21a. Alternatively or additionally, reducing agent slurry could be supplied to interior 13a of container 13 through an inlet 21 in horizontal lid 20. Reducing agent slurry supply 21a may be a tank or any suitable storage container for the storage of a reducing agent slurry. At front wall 17, is an overflow outlet 22, through which moist reducing agent from the reducing agent slurry is uniformly distributed within fluidly connected CDS reactor 12 in vertical portion 10.

Between horizontal upper bottom 18 and horizontal lower bottom 19 is a chamber 23. Horizontal upper bottom 18 forms the top of chamber 23 and horizontal lower bottom 19 forms the bottom of chamber 23. The reducing agent slurry supplied to container 13 through inlet 21 in rear wall 16 from slurry supply 21a is supported on a top surface 18a of horizontal upper bottom 18. Horizontal upper bottom 18 consists of an air-permeable cloth of polyester mounted in stretched state within container 13. Excess water from the reducing agent slurry passes downwardly by gravity through horizontal upper bottom 18 into chamber 23. Air from an air supply 24 enters chamber 23 though one or more inlets 25 so as to fluidize the moist reducing agent remaining on top surface 18a of horizontal upper bottom 18. In horizontal lower bottom 19 is an outlet 19a for removal of excess water that drains from the reducing agent slurry through horizontal upper bottom 18 and into chamber 23. Excess water from the reducing agent slurry drains from chamber 23 via outlet 19a for return to lime slurry supply 21a, or alternatively, for use elsewhere or disposal.

Two juxtaposed, horizontal shafts 28 extend along the entire container 13 and are rotatably mounted in the front wall 17 and rear wall 16 with the aid of bearings 29. A motor 31 is arranged to rotate shafts 28 via a transmission unit 32. Each shaft 28 supports a plurality of elliptic discs 33, which are mounted in an intermittently spaced apart and inclined state on the shafts 28. Each disc 33 is inclined with respect to the shafts 28 so that the angle "A" between the longitudinal axis of the shafts 28 and discs 33 is about 60 degrees, or may vary from 45 degrees to 80 degrees. The discs 33 are so positioned on shafts 28 so the discs 33 of one shaft 28 fit between the discs 33 of the other shaft 28.

Discs 33 positioned as described above on shafts 28, during rotation of shafts 28, perform a throwing movement conducive to thorough mixing and movement of the moistened reducing agent to CDS reactor 12. As a result, moist reducing agent is continuously introduced into CDS reactor 12 for uniform distribution and contact with the flue gases over the entire horizontal cross section of the CDS reactor 12. The reacted and dried reducing agent entrained by the flue gases enter a fabric filter module 34. Particulate matter including reacted and dried reducing agent is collected in hoppers 36 of fabric filter module 34 and transported through fluidly connected duct 38 to container 13 for mixture with the moistened reducing agent therein. Cleaned flue gases exit fabric filter module 34 via fluidly connected duct 40 for release to the atmosphere via fluidly connected stack 9.

In summary, the subject AQCS comprises a circulating dry scrubber dry flue gas desulfurization system useful for at least partially removing pollutants from a flue gas, wherein the CDS DFGD system comprises a dry scrubber reactor arranged in a vertical gas duct fluidly connected to a feed device supplying moistened reducing agent from a reducing agent slurry supply to the dry scrubber reactor, an outlet in said feed device for excess water drainage, and a particulate removal device fluidly connected downstream from the vertical gas duct. The system's particulate removal device captures particulate matter in flue gas flowing from the vertical gas duct and the particulate removal device includes hoppers for collected particulate matter and the collected particulate matter in the hoppers is transported to the feed device. The system's feed device supplies moistened reducing agent to the dry scrubber reactor with uniform distribution across a horizontal cross section thereof. As such, the moistened reducing agent from the system's feed device contacts flue gas in the dry scrubber reactor and reacts with pollutants in the flue gas to at least partially remove pollutants from the flue gas. The reducing agent used in the system is lime and the system's particulate removal device is either a fabric filter or an electrostatic precipitator.

A method of using the subject system to at least partially remove pollutants from a flue gas comprises passing said flue gas laden with acidic pollutants into said dry scrubber reactor, reacting said flue gas with a moist reducing agent in said dry scrubber reactor to form dry particulates, and removing said dry particulates from said flue gas using said particulate removal device prior to said flue gas passage through an outlet opening. As noted above, this method is accomplished using lime as the reducing agent and using a fabric filter or an electrostatic precipitator as the system's particulate removal device.

Various embodiments of the present invention have been described herein. The descriptions are intended to be illustrative of the present invention. It will be apparent to one of skill in the art that modifications may be made to the invention as described without departing from the scope of the claims set forth below. For example, it is to be understood that although some of the embodiments of the present invention have been described in the context of an AQCS of a particular arrangement, it should be appreciated that other arrangements may be used without deviation from the spirit and scope of the claims below.

What is claimed:

1. A circulating dry scrubber dry flue gas desulfurization system useful for at least partially removing pollutants from a flue gas comprising:
   a dry scrubber reactor arranged in a vertical gas duct;
   a feed device connected to the dry scrubber reactor comprising:
      an air permeable upper bottom;
      an inlet for a supply of reducing agent slurry onto the air permeable upper bottom;
      an inlet for a supply of air below the air permeable upper bottom for upward air passage therethrough;
      a lower bottom below the upper bottom; and
      a drain in the lower bottom for drainage therefrom of a downward flow of liquid separated from the reducing agent slurry through the air permeable upper bottom onto the lower bottom;
   the feed device operable to supply to the dry scrubber reactor a moistened reducing agent separated from the reducing agent slurry within the feed device; and
   a particulate removal device fluidly connected downstream from the vertical gas duct.

2. The system of claim 1, wherein the particulate removal device captures particulate matter in flue gas flowing from the vertical gas duct.

3. The system of claim 1, wherein the particulate removal device includes hoppers for collected particulate matter and the collected particulate matter in the hoppers is transported to the feed device.

4. The system of claim 1, wherein the feed device is operative to supply moistened reducing agent to the dry scrubber reactor with uniform distribution across a horizontal cross section thereof.

5. The system of claim 1, wherein the feed device is operative to supply moistened reducing agent for contact with flue gas in the dry scrubber reactor to at least partially remove pollutants from the flue gas.

6. The system of claim 1, wherein said dry scrubber reactor is supplied with lime as the reducing agent.

7. The system of claim 1, wherein said particulate removal device is a fabric filter.

8. The system of claim 1, wherein said particulate removal device is an electrostatic precipitator.

9. A method of using the system claim 1, to at least partially remove pollutants from a flue gas comprising:
   a.) passing said flue gas laden with acidic pollutants into said dry scrubber reactor;
   b.) reacting said flue gas with a moist reducing agent in said dry scrubber reactor to form dry particulates; and
   c.) removing said dry particulates from said flue gas using said particulate removal device prior to said flue gas passage through an outlet opening.

10. The method of claim 9, wherein said reducing agent is lime.

11. The method of claim 9, wherein said particulate removal device is a fabric filter.

12. The method of claim 9, wherein said particulate removal device is an electrostatic precipitator.

* * * * *